May 27, 1958     L. W. ERATH     2,836,723
SYNCHRONIZED PHASE SHIFT OSCILLATOR
Filed Nov. 28, 1955
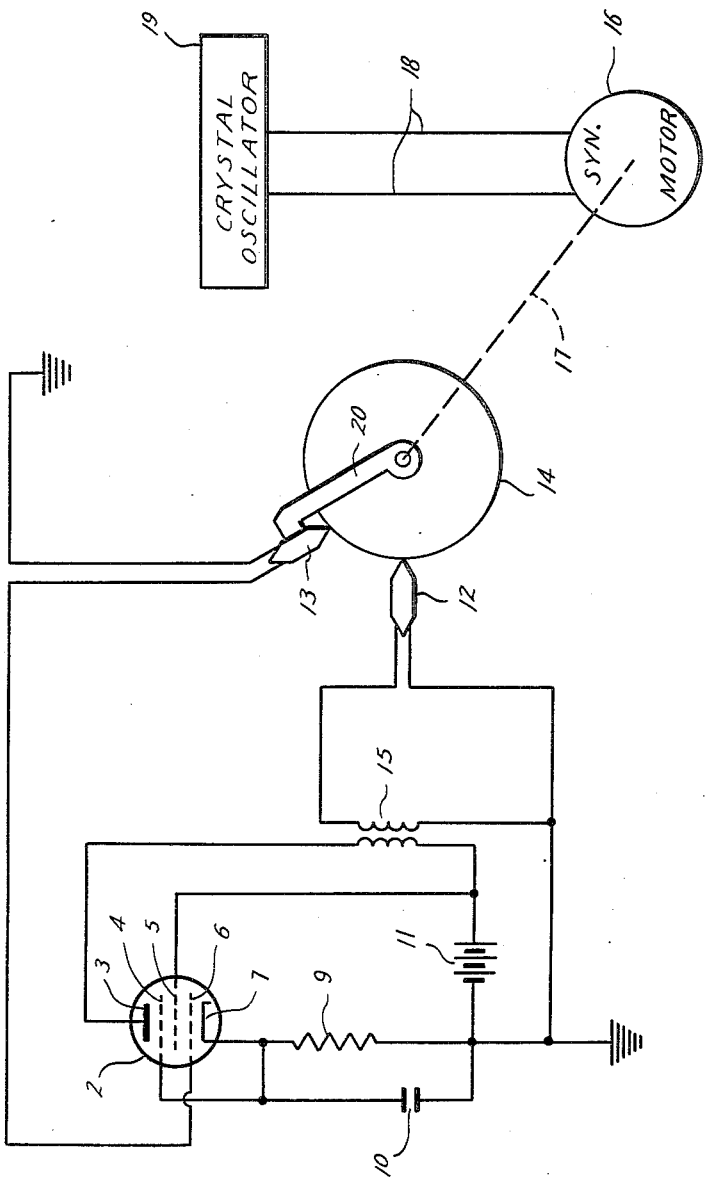
Louis W. Erath
INVENTOR.
BY Thomas O Arnold
ATTORNEY

2,836,723
SYNCHRONIZED PHASE SHIFT OSCILLATOR

Louis W. Erath, Houston, Tex., assignor, by mesne assignments, to Southwestern Industrial Electronics Company, Houston, Tex., a corporation of Delaware Application November 28, 1955, Serial No. 549,289

6 Claims. (Cl. 250—36)

This invention relates generally to oscillators and more particularly to improvements in delay line wide range oscillators.

It is common in the design of electrical circuits that it is desired to delay the transmission of a signal. Sometimes it is desirable to be able to vary the amount of such delay from a minute phase shift to a 180° phase shift, and sometimes it is desirable to delay a signal even longer. For example, in certain types of vacuum tube oscillators the phase of the plate current is shifted and the resultant is fed back to the grid. These oscillators frequently suffer from frequency instability due to variations in the amount of delay in transmission of the feedback, i. e., variations in phase shift, which may result from temperature changes in the elements and from other factors.

An object of this invention is to provide novel means for accomplishing phase shift.

A further object of this invention is to provide a novel and improved phase shift type wide range oscillator.

Another and prime object of this invention is to provide an improved oscillator with a very wide range of frequencies which has the long term stability of a crystal oscillator.

Other objects are apparent from the following description and accompanying drawings wherein:

The single figure is a schematic diagram of the improved wide range delay line oscillator of this invention, including the novel means for delaying transmission of a signal which is a part of this invention.

The particular type of oscillator illustrated can be viewed as an amplifier with feedback. The phase of the feedback determines the frequency of the oscillation. The heart of the amplifier shown is an electron tube, which in the embodiment illustrated is a pentode 2. Other electron tubes, transistors and the like may be used. If a transistor is used, for example, then its base is the "control grid" indicated herein.

The pentode 2 has a plate or anode 3, suppressor grid 4, screen grid 5, control grid 6 and cathode 7. The cathode 7 and suppressor grid 4 are connected together. A resistor 9 and a capacitor 10 are connected in parallel between the cathode 7 and ground. There is a plate voltage battery 11 with its negative side connected to the ground and its positive side connected to the screen grid 5.

Means are provided for making a record of the plate current in the pentode 2. A recording head may be placed in the plate circuit of the pentode 2, but in the embodiment shown, the primary of a transformer 15 is connected between the plate 3 and the positive side of the battery 11. The secondary of the transformer 15 is connected across a recording head 12.

The control grid 6 is connected to a recording pickup head 13, which head is also connected to ground. Both the recording head 12 and the pickup head 13 are adapted to co-operate with a record 14 in the recording and picking up of signals.

The recording means may be of any convenient form, whether mechanical, optical, magnetic or otherwise. It is preferred that the means used be such as to permit erasing of prior recording. Conveniently, therefore, a magnetic tape record, mounted on a drum may be used. A permanent magnet or alternating field may be set up in advance of the recording head 12, to erase the previously recorded signal, or in appropriate cases the act of recording anew on the same path on the record may serve to accomplish the erasing as well as new recording. On the other hand, nonerasable recording can be used if a record with a long enough recording path is provided.

The record may be driven by any means, but if the full frequency stability potentialities of this invention are to be attained, the speed of the record must be as uniform as possible. One of the most precise speed controls is by means of a crystal.

Conveniently, the magnetic tape record 14 may be mounted on a drum of large inertia, and that drum may be driven by a synchronous motor 16 by means of a shaft 17. Preferably, the synchronous motor 16 is in turn powered via lines 18 by a crystal controlled oscillator 19. A power amplifier may be used in conjunction with the crystal controlled oscillator 19 if desired. If a crystal oscillator is used to drive the drum, then while the instantaneous frequency of the wide range oscillator may vary slightly due to such factors as variations in lag of the synchronous motor behind the crystal oscillator signal, the average frequency over a long time of the wide range oscillator will drift no more than does the crystal oscillator, whether the wide range oscillator be set for a high or low frequency. Alternatively to the above described driving means, the drive mechanism disclosed in my co-pending application Serial Number 469,911, filed November 19, 1954, may be used to drive the record at substantially uniform speeds.

Conveniently, the pickup head 13 may be mounted on a rotatable arm 20, thereby permitting the displacement between the recording head 12 and the pickup head 13 to be conveniently adjusted at will. The recording head 12 leads the pickup head 13; or phrased conversely, the pickup head is down the recording path from the recording head, or is below the recording head on the recording path.

As the record moves and a signal is recorded by the recording head 12, that same signal is simultaneously picked up by the pickup head 13, the signal derived at the pickup head being a delayed version of the signal recorded by the recording head.

The amount of delay between recorded and picked up signals may be varied by varying the distance, along the record path, between the recording and pickup heads. It is for the purpose of permitting this variation in distance, that one or the other of the heads is movably mounted so that it can be moved to new positions on the record.

The phase of the feedback to the grid 6 is controlled by the amount of delay introduced between the recording head 12 and the pickup head 13. The frequency of oscillation, which is, of course, that frequency at which the spacing between the heads is equal to an odd multiple of 180° of the recorded signal, may therefore be varied by moving the pickup head 13 toward or away from the recording head 12. Frequencies from less than 100 C. P. S. to over 10,000 C. P. S. are readily obtainable, and with more frequency stability than is accomplished with other wide frequency range oscillators. This type of wide range oscillator can have the same long term frequency stability as the crystal oscillator used to drive the drum.

In order for oscillations to build up, the product of the ratio of the amplitude of voltage fed back to the output voltage of the amplifier and the gain of the amplifier must be at least equal to one, as pointed out in "Phase-Shift Oscillators," Ginzton et al., Proceedings I. R. E., February 1941, pp. 43–48. In the embodiment disclosed herein, the entire output voltage of the amplifier is fed back so that the gain of the amplifier need only be unity. Of course, if the ratio referred to is less than 1, the gain must be greater.

It is interesting to note at least two of the several possibilities of loading this oscillator. For example, a load may be placed in parallel with the recording head 12. Or, since for any given frequency adjustment, the frequency of the oscillator is recorded upon the record 14, the product of the oscillator can be derived by yet another pickup on the same record 14, which may be positioned anywhere on the recording path below the recording head 12. The character of the load so derived has not the slightest effect upon either the amplitude or frequency stability of the oscillator. The oscillator itself may be a fairly small unit demanding little power, and the output may be picked up from the record and amplified to supply a very large load without effecting the frequency or amplitude stability of the oscillator in the slightest particular.

Modifications may be made in the invention as described herein without departure from the scope of the invention. Accordingly, the foregoing description is to be construed as illustrative only, and is not to be construed as any limitation upon the invention as described in the following claims.

I claim:

1. An oscillator comprising the combination of an amplifier including at least an anode, a cathode and a control grid operable to control flow of current from said anode to said cathode and including output circuitry connecting said anode to said cathode; a crystal controlled oscillator a synchronous motor powered by said crystal controlled oscillator; a record driven by said synchronous motor; a recording member coupled to said output circuitry for recording the output of the amplifier upon said record; a pickup member spaced from the recording member operable to pick up from said record the signal recorded thereon; and control circuitry coupled to said pickup member connected between said control grid and cathode.

2. An oscillator comprising the combination of an amplifier including at least an anode, a cathode, and a control grid operable to control the flow of current from said anode to said cathode, and including output circuitry connecting said anode to said cathode; a source of alternating current power of high frequency stability; a synchronous motor powered from said source of power; a record driven by said synchronous motor; a recording member coupled to said circuitry for recording the output of the amplifier upon said record; a pickup member spaced from the recording member operable to pick up from said record the signal recorded thereon; and control circuitry coupled to said pickup member connected between said control grid and cathode.

3. In an oscillator comprising an amplifier including anode, cathode and control grid operable to control the flow of current from said anode to said cathode, and including output circuitry connecting said anode to said cathode, the combination of a source of alternating current power of high frequency stability; a synchronous motor powered by said source; a record driven by said synchronous motor; a recording member coupled to said output circuitry for recording the output of the amplifier upon said record; a pickup member spaced from the recording member operable to pick up from said record the signal recorded thereon; and control circuitry coupled to said pickup member connected between said control grid and cathode.

4. An oscillator comprising an amplifier having an input and an output, recording means including a record, a recording member, a pickup member, and means for moving said record past the recording member and the pickup member, said recording member being connected to the output of said amplifier and operable to record that output on the record, said pickup member being spaced from the recording member in the direction of travel of the record and being connected to the input of said amplifier so as to impress the amplifier output on its input after a time delay determined by the speed of travel of the record and the spacing between the recording member and the pickup member, the input of said amplifier being sufficiently large that the amplifier oscillates at a frequency determined by said time delay.

5. The apparatus of claim 4 in which one of said recording member and pickup member is adjustable in position with respect to the other so as to vary the spacing therebetween and consequently the frequency of output of the oscillator.

6. The apparatus of claim 5 in which said means for moving said record includes a constant speed drive and a drum for mounting the record rotatable by said constant speed drive.

References Cited in the file of this patent

UNITED STATES PATENTS

| | | |
|---|---|---|
| 1,442,781 | Nichols | Jan. 16, 1923 |
| 2,382,413 | Hanert | Aug. 14, 1945 |
| 2,424,633 | Rieber | July 29, 1947 |
| 2,446,479 | Begun | Aug. 3, 1948 |
| 2,513,683 | Shaper et al. | July 4, 1950 |
| 2,566,189 | Gloess | Aug. 28, 1951 |

OTHER REFERENCES

Article: "Phase-Shift Oscillators," by Ginzton et al.; pages 43–48 of P. I. R. E. for February 1941.